Oct. 31, 1933.  R. CHILTON  1,933,494
UNIVERSAL JOINT
Filed Jan. 30, 1929

Inventor
Roland Chilton
By Cameron, Kerkam & Sutton
Attorneys

Patented Oct. 31, 1933

1,933,494

UNITED STATES PATENT OFFICE 1,933,494

UNIVERSAL JOINT

Roland Chilton, Keyport, N. J., assignor, by mesne assignments, to Eclipse Machine Company, Elmira Heights, N. Y., a corporation of New York Application January 30, 1929. Serial No. 336,309

12 Claims. (Cl. 64—91)

This invention relates to universal joints and one of the objects of the present invention is to provide a universal joint which is light, and of small dimensions, but strong and efficient in operation.

Another object of the invention is the provision of a universal joint which is adapted to transmit a substantially uniform angular velocity under all conditions of service.

Another object is the provision of such a device in which the relative angular movements of the shafts are limited in a positive manner without placing any unusual stresses on the transmitting elements of the joint.

Another object is the provision of a universal joint which embodies a small number of operating elements, all of which are of simple form and economical to manufacture.

Another object is the provision of such a device in which the parts are arranged to transmit the power efficiently without being subjected to objectionable weaving forces.

Figure 1:
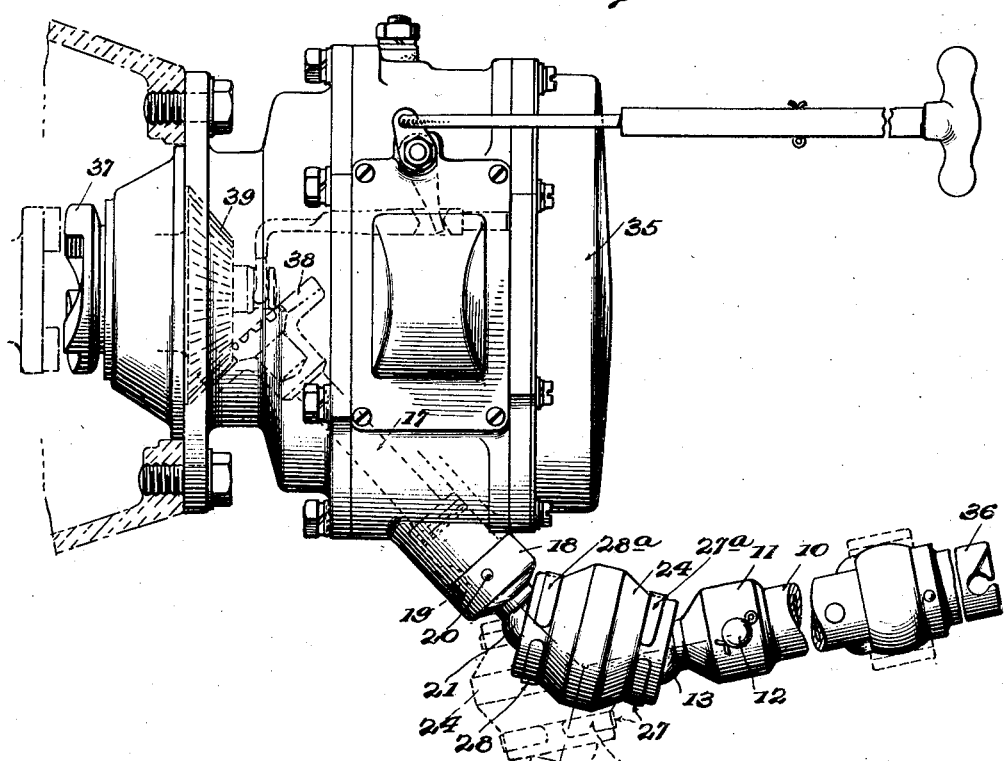
Figure 2:
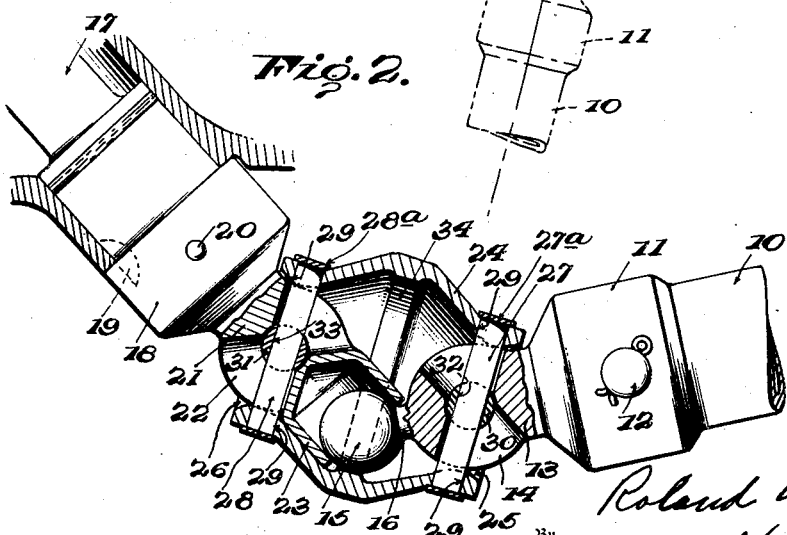

The above and other objects and advantages will become apparent to those skilled in the art from the following description taken in connection with the accompanying drawing, in which:

Fig. 1 is a side elevation of one embodiment of the invention as applied to a starting device for internal combustion engines; and Fig. 2 is a longitudinal mid-sectional view of the device.

It is well known in the art of power transmission that a single universal joint of the type embodying pivotal motion around two axes at right angles to each other is incapable of transmitting uniform angular velocity from a driving shaft to a driven shaft. During parts of each revolution the driven shaft lags behind the driving shaft, and during other portions of the revolution the driven shaft runs ahead of the driving shaft, this effect being aggravated by increasing the angular deflection between the shafts.

This effect has been obviated by the use of a pair of similar universal joints, used in conjunction with some means for maintaining an intermediate transmission element between the two joints in equiangular relation with the driving and driven shafts. The means heretofore proposed for performing this function has embodied additional parts of special form which frequently limited the angular relations of the driving and driven shafts to an undesirable extent, and which were often subjected to heavy stresses, particularly when so limiting said angular relationship. Moreover, the extra complication of these joints rendered assembly difficult and lubrication uncertain, and increased the liability of failure of the joint.

The present invention provides a universal joint which accomplishes the desired function without embodying any additional elements, and which obviates all the above mentioned disadvantages.

Referring first to Fig. 2 of the drawing, which illustrates a preferred embodiment of the invention, a drive shaft 10 has a universal joint member 11 rigidly connected thereto as by means of a diametrically arranged pin 12. The member 11 is provided with a substantially spherical extension 13 which is broached to form a diametrical outwardly flaring passage therethrough having flattened sides 14 which constitute power transmitting surfaces. The member 11 terminates in a spherical head 15 joined thereto by a neck portion 16 formed integrally therewith or suitably fixed thereto.

A driven shaft 17 is provided with a universal joint member 18 fixed thereon in any suitable manner as by means of a key 19 and a transverse pin 20, and is provided with a substantially spherical portion 21 which is also broached to form a diametrical outwardly flaring passage having flat power transmitting surfaces 22. The universal joint member 18 terminates in a hollow cylindrical extension 23 which is adapted to receive and fit closely around the spherical head 15 while allowing free longitudinal and relative rotary motion thereof.

An intermediate power transmitting barrel member 24 is formed with openings 25 and 26 at its ends adapted to fit closely over the spherical portions 13 and 21 of the universal joint members, and transverse pins 27 and 28 traverse said openings diametrically and have a working fit between the surfaces 14 and 22 of the broached passages in the extensions 13 and 21 respectively. The pins 27 and 28 are fixed at the ends thereof in the barrel member 24 in any suitable manner as by traversing the registering holes 29 therein and having the ends thereof in engagement with suitable spring rings, 27a and 28a, respectively, removably carried by barrel member 24.

The spherical extensions 13 and 21 are also preferably drilled centrally at right angles to the surfaces 14 and 22 respectively, and cylindrical bearing blocks or pins 30 and 31 respectively are mounted therein and are provided with diametrical passages 32 and 33 respectively to receive the driving pins 27 and 28.

The barrel member 24 is enlarged centrally thereof, and is provided internally with an equatorial rib 34 against which the spherical head 15 is adapted to bear in the limiting angular relation of the barrel and driving shaft 10. The intermediate portion between the rib 34 and the opening 26 in the barrel may be formed as a conical surface against which the cylindrical extension 23 of the universal joint member 18 is adapted to bear in the limiting angular position of the barrel 24 and the driven shaft 17.

In operation, with the shafts arranged for instance at their maximum angular relationship as shown in Fig. 2, rotation of the driving shaft 10 will be transmitted through the universal joint member 11 and pin 27 to the barrel 24, and rotary motion of the barrel 24 is transmitted to the driven shaft 17 in a similar manner by the pin 28 and the universal joint member 18.

It will be seen that due simply to the interfitting arrangement of the universal joint members 11 and 18, and the fact that relative endwise motion between the barrel 24 and the universal joint members is prevented by the bearing blocks 30 and 31, the equiangular relationship between the barrel 24 and the shafts 10 and 17 is substantially maintained at all times irrespective of the total angularity between the shafts. By reason of the equiangular relationship of the driving shaft 10 and driven shaft 17 with the barrel 24, and the co-planar arrangement of the pins 27 and 28, when the barrel 24 is lagging behind the driving shaft it is lagging behind the driven shaft to the same extent, and when the barrel runs ahead of the driving shaft it also runs ahead of the driven shaft an equal amount, so that the driving shaft and driven shaft constantly rotate at equiangular speed.

In Fig. 1 the invention is illustrated as applied to a cranking shaft for an engine starter 35. The driving shaft 10 is provided with crank-engaging means 36, and the driven shaft 17 is connected to rotate the starter clutch member 37 through bevel gears 38 and 39. It will be noted that by reason of the cooperation of the bevel gear drive with the novel universal joint, the starter can be cranked either from the side or the rear without altering the position of the starter.

Although but one embodiment of the invention has been shown and described in detail, it is to be expressly understood that the illustrated embodiment is not exclusive, and various other embodiments will now present themselves to those skilled in the art, while changes may be made in the construction, arrangement and proportions of parts, and certain features used without other features, without departing from the spirit of the invention. Reference is therefore to be had to the claims hereto appended for a definition of the limits of the invention.

What is claimed is:—

1. In a universal joint, a driving member, a driven member, and an intermediate transmission member, universal pivotal driving connections between said intermediate member and said driving and driven members respectively, and inter-engaging extensions formed integral with said driving and driven members and positioned so as to engage the inner surface of said intermediate member to maintain the driving and driven members in a substantially equiangular relationship with said intermediate member when said driving and driven members are in the positions of maximum deflection.

2. In a universal joint, a driving member, a driven member, an intermediate transmission member, universal pivotal driving connections between said intermediate member and said driving and driven members respectively, and interfitting ball and socket members formed on the adjacent ends of said driving and driven members engaging each other and positioned so as to engage the inner surface of said intermediate member to maintain the driving and driven members in a substantially equiangular relationship with said intermediate member when said driving and driven members are in the positions of maximum deflection.

3. In a universal joint, a driving member, a driven member, and an intermediate transmission member, universal pivotal driving connections between said intermediate member and said driving and driven members respectively, and interfitting ball and socket members formed on the adjacent ends of said driving and driven members and cooperating with said intermediate member to maintain the driving and driven members in an equiangular relationship with said intermediate member, said ball and socket members being adapted to bear internally on said intermediate member to limit the maximum relative angular deflection of the driving and driven members.

4. A universal joint adapted to transmit a substantially constant angular velocity including driving and driven members having spherical portions with diametrical flared openings therein, an intermediate transmission member having diametral pins fixed in parallel relation near its ends and adapted to traverse said flared openings, and means for substantially equalizing the angular relations of the driving and driven members to the intermediate member, when the former are in positions of maximum deflection.

5. A universal joint adapted to transmit a substantially constant angular velocity including driving and driven members having spherical portions with diametrical flared openings therein, an intermediate transmission member having its ends adapted to fit over said spherical portions and having diametral pins fixed in parallel relation near its ends and adapted to traverse said flared openings, and means for substantially equalizing the angular relations of the driving and driven members to the intermediate member, when the former are in positions of maximum deflection.

6. A universal joint adapted to transmit a substantially constant angular velocity including driving and driven members having spherical portions with diametrical flared openings therein, an intermediate transmission member having its ends adapted to fit over said spherical portions and having diametral pins fixed in parallel relation near its ends and adapted to traverse said flared openings, and inter-fitting ball and socket means for substantially equalizing the angular relations of the driving and driven members to the intermediate member, when the former are in positions of maximum deflection.

7. A universal joint adapted to transmit a substantially constant angular velocity including driving and driven members having spherical portions with diametrical flared openings therein, an intermediate transmission member having its ends adapted to fit over said spherical portions and having diametral pins fixed in parallel relation near its ends and adapted to traverse said flared openings, means preventing relative endwise movement between the driving, driven and intermediate members, means for substantially equalizing the angular relations of the driving and driven members to the intermediate member when the former are in positions of maximum deflection.

8. A universal joint adapted to transmit a substantially constant angular velocity including driving and driven members having spherical portions with diametrical flared openings therein, an intermediate transmission member having its ends adapted to fit over said spherical portions and having diametral pins fixed in parallel relation near its ends and adapted to traverse said flared openings, cylindrical bearing blocks pivoted in said spherical portions at right angles to said openings and forming bearings for said pins preventing relative endwise movement between the driving, driven and intermediate members, means for substantially equalizing the angular relations of the driving and driven members to the intermediate member when the former are in positions of maximum deflection.

9. A universal joint adapted to transmit a substantially constant angular velocity including driving and driven members having spherical portions with diametrical flared openings therein, an intermediate transmission member having its ends adapted to fit over said spherical portions and having diametral pins fixed in parallel relation near its ends and adapted to traverse said flared openings, and means for substantially equalizing the angular relations of the driving and driven members to the intermediate member, when the former are in positions of maximum deflection, said means being engageable with the inner surface of said intermediate member in said position of maximum angular deflection.

10. A universal joint adapted to transmit constant angular velocity including driving and driven members having spherical portions with diametrical flared openings therein, an intermediate transmission member having its ends adapted to fit over said spherical portions and having diametral pins fixed in parallel relation near its ends and adapted to traverse said flared openings, and interfitting ball and socket means formed on said driving and driven members for equalizing their angular relation with the intermediate member, said ball and socket means being adapted to bear internally on the intermediate member to limit the maximum relative angular deflection of the driving and driven members.

11. In a universal joint, a driving member, a driven member, an intermediate transmission member, universal pivotal driving connections between said intermediate member and said driving and driven members respectively, and interfitting ball and socket members formed on the adjacent ends of said driving and driven members and cooperating with said intermediate member to limit the maximum relative angular deflection of the driving and driven members.

12. In a universal joint, a driving member, a driven member, a ball end on one of said members, a socket end on the other of said members, said socket member fitting over and contacting said ball end and an intermediate transmission member, said ball and socket ends being adapted to bear internally against said intermediate member to maintain the driving and driven members in a substantially equiangular relationship with said intermediate member when the driving and driven members are in positions of relative angular deflection.

ROLAND CHILTON.